United States Patent
Satran et al.

(10) Patent No.: US 8,202,026 B2
(45) Date of Patent: Jun. 19, 2012

(54) CUTTING INSERT

(75) Inventors: Amir Satran, Kfar Vradim (IL); Yaron Eisen, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 855 days.

(21) Appl. No.: 12/272,992

(22) Filed: Nov. 18, 2008

(65) Prior Publication Data
US 2009/0136304 A1    May 28, 2009

(30) Foreign Application Priority Data
Nov. 28, 2007   (IL) .......................................... 187721

(51) Int. Cl.
*B23B 27/16*    (2006.01)
*B23C 5/02*    (2006.01)
(52) U.S. Cl. .......................................... 407/113; 407/42
(58) Field of Classification Search .................. 407/113, 407/114, 42, 48, 61, 62
See application file for complete search history.

(56) References Cited

U.S. PATENT DOCUMENTS

| | | | |
|---|---|---|---|
| 3,416,209 A | 12/1968 | Contrucci et al. | |
| 3,490,117 A * | 1/1970 | Hertel | 407/104 |
| 3,701,187 A | 10/1972 | Erkfritz | |
| 4,714,383 A | 12/1987 | Shimomura et al. | |
| 4,790,693 A | 12/1988 | Koblesky | |
| 5,586,843 A | 12/1996 | Minicozzi | |
| 6,238,146 B1 | 5/2001 | Satran et al. | |
| 7,008,146 B2 * | 3/2006 | DeRoche et al. | 407/42 |
| 7,097,393 B2 * | 8/2006 | Satran et al. | 407/113 |
| 7,549,825 B2 * | 6/2009 | Wermeister | 407/113 |
| 2003/0215294 A1 * | 11/2003 | Wermeister et al. | 407/113 |
| 2007/0104546 A1 * | 5/2007 | Maeta et al. | 407/113 |

OTHER PUBLICATIONS

International Search Report in PCT/IL2008/001523, dated Mar. 27, 2009.

* cited by examiner

*Primary Examiner* — Boyer D Ashley
*Assistant Examiner* — Sara Addisu
(74) *Attorney, Agent, or Firm* — Womble Carlyle

(57) ABSTRACT

A tangential cutting insert has three pairs of surfaces. A first pair has upper and lower surfaces, a second pair has front and rear surfaces, and a third pair has two side surfaces. The upper and lower surfaces and the side surfaces extend between the front and rear surfaces. A main cutting edge is formed at the intersection of the front surface with the upper surface. A front portion of the upper surface extends rearwardly from the main cutting edge and upwardly toward a central portion of the upper surface as seen in a side view of the cutting insert. The main cutting edge associated with the upper surface is curved and slopes downwardly toward each of the auxiliary cutting edges as seen in a front view of the cutting insert.

24 Claims, 7 Drawing Sheets

CUTTING INSERT

FIELD OF THE INVENTION

The present invention relates to tangential cutting inserts.

BACKGROUND OF THE INVENTION

Tangential cutting inserts are often used with milling cutters such as slotting cutters or extended flute cutters. Examples of such cutting inserts are found in U.S. Pat. No. 3,416,209, U.S. Pat. No. 3,490,117, U.S. Pat. No. 3,701,187 and U.S. Pat. No. 4,790,693.

U.S. Pat. No. 6,238,146 discloses an improved tangential cutting insert. The cutting insert has a body with an operative front surface associated with upper and lower main cutting edges. Each of the main cutting edges is connected, through corner edges, to side auxiliary cutting edges. The main cutting edges, side auxiliary cutting edges and corner edges have a rake surface associated therewith in the front surface of the cutting insert.

The two main cutting edges of the cutting insert of '146 each comprise two lateral component cutting edges giving rise to four right hand cutting edges and four left hand cutting edges. However, only one lateral component cutting edge of a given main cutting edge can be used at a time as a cutting edge to machine a 90° shoulder. If the cutting insert of '146 were to use the entire length of a main cutting edge to machine an extended shoulder, i.e., using two adjacent lateral component cutting edges, the result will not be a straight 90° shoulder.

SUMMARY OF THE INVENTION

In accordance with the present invention there is provided a cutting insert having a front surface extending between an upper surface, a lower surface and two side surfaces that extend between the upper surface and the lower surface, the upper surface joins each of the side surfaces through a corner surface at each side of the upper surface;

a main cutting edge associated with the upper surface is formed at the intersection of the front surface with the upper surface, auxiliary cutting edges are formed at the intersection of the front surface with each of the side surfaces, and, corner cutting edges are formed at the intersection of the front surface with each of the corner surfaces;

the main cutting edge, the auxiliary cutting edges and the corner cutting edges have a rake surface associated therewith in the front surface; wherein a front portion of the upper surface extends rearwardly from the main cutting edge and upwardly toward a central portion of the upper surface as seen in a side view of the cutting insert, and the main cutting edge is curved and slopes downwardly toward each of the auxiliary cutting edges as seen in a front view of the cutting insert.

Typically, the main cutting edge slopes inwardly and rearwardly from the corner cutting edges as seen in a top view of the cutting insert, and, the entire length of the main cutting edge lies on a cylindrical surface.

If desired, the front surface has mirror symmetry with respect to a first symmetry plane that is located midway between the upper and lower surfaces, and the rake surface extends along the entire circumference of the front surface.

Further if desired, the cutting insert has mirror symmetry with respect to a second symmetry plane that is perpendicular to the central portion of the upper surface and to the side surfaces, the second symmetry plane is located midway between the front surface and a rear surface.

Typically, the cutting insert further comprises a through bore that extends between the upper surface and the lower surface.

In some embodiments, the main cutting edge is continuously curved as seen in a top view of the cutting insert.

Still in some embodiments, the main cutting edge comprises two lateral cutting edge sections that slope inwardly and rearwardly from the corner cutting edges and a central cutting edge section between the two lateral cutting edge sections, as seen in a top view of the cutting insert.

If desired, the cutting insert further comprises a relief surface at one of the side surfaces, the relief surface joins one of the auxiliary cutting edges at a first edge of the relief surface and a corner surface at a second edge of the relief surface.

Further if desired, the cutting insert has rotational symmetry with respect to a symmetry axis that is located midway between the central portion of the upper and lower surfaces, parallel to the central portion of the upper and lower surfaces and parallel to the side surfaces.

Typically, the front portion of the upper surface extends upwardly toward the central portion of the upper surface at an upper slant angle as seen in a side view of the cutting insert, the upper slant angle is in the range of 1° to 15°.

According to a specific embodiment of the present invention, the upper slant angle is about 7°.

If desired, the cutting insert has a first land that extends from the main cutting edge toward the lower surface, the first land is slanted at a first land angle with respect to a second symmetry plane that is perpendicular to the central portion of the upper surface and to the side surfaces, the first land angle is in the range of −10° to 20° as seen in a side cross-section of the main cutting edge and measured upwardly from the main cutting edge.

According to a specific embodiment of the present invention, the first land angle is about 10°.

Typically, the cutting insert has a second land that extends from the first land toward the lower surface, the second land is slanted at a second land angle with respect to the second symmetry plane, the second land angle is in the range of −10° to 25° as seen in a side cross-section of the main cutting edge and measured downwardly from the main cutting edge.

According to a specific embodiment of the present invention, the second land angle is about 5°.

Typically, the rake surface extends from the second land toward the lower surface, the rake surface is slanted at a rake angle with respect to the second symmetry plane, the rake angle is in the range of 0° to 60° as seen in a side cross-section of the main cutting edge and measured upwardly from the main cutting edge.

According to a specific embodiment of the present invention, the rake angle is about 44°.

If desired, the main cutting edge is curved and formed from various arc segments, each of the arc segments has a different radius, the radii of the various arc segments vary from 5 mm to infinity, as seen in a front view of the cutting insert.

Typically, the relief surface is slanted at a radial relief angle with respect to a third symmetry plane that is parallel to a central portion of the side surfaces, perpendicular to the central portion of the upper and lower surfaces and passes through a center of the front surface, the radial relief angle is in the range of 0° to 5° as seen in a front view of the cutting insert.

According to a specific embodiment of the present invention, the radial relief angle is about 2.8°.

Further typically, the relief surface is slanted at a peripheral relief angle with respect to the third symmetry plane, the peripheral relief angle is in the range of 0° to 8°.

According to a specific embodiment of the present invention, the peripheral relief angle is about 3°.

In some embodiments, the two lateral cutting edge sections form therebetween a lateral section angle that is in the range of 140° to 180°.

According to a specific embodiment of the present invention, the lateral section angle is about 160°.

If desired, the rake surface extends in an inward direction of the cutting insert.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
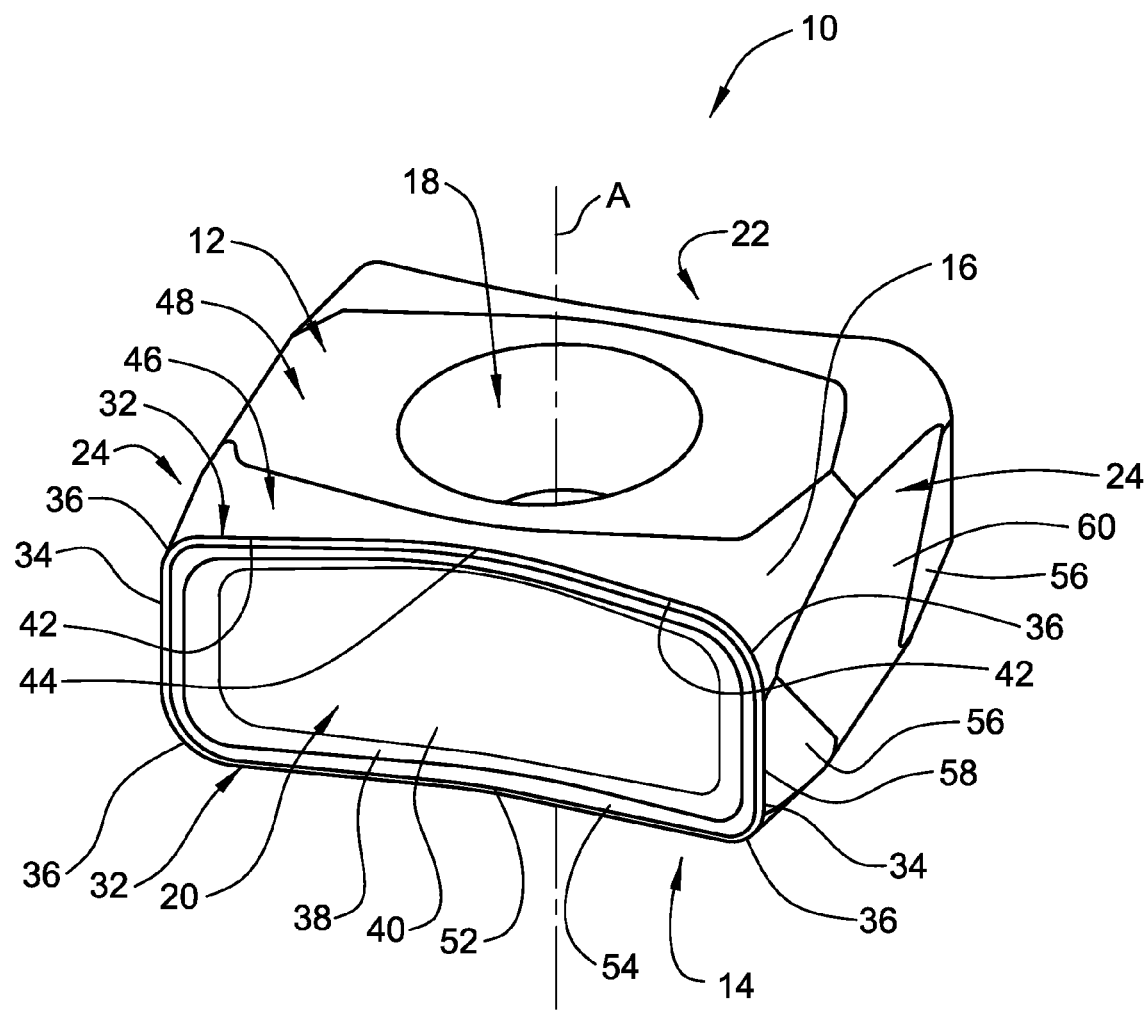
FIG. 1 is a perspective view of a cutting insert in accordance with the present invention.

Attention is first drawn to FIGS. 1 to 7 showing a cutting insert 10 in accordance with a first embodiment of the present invention. The cutting insert 10 comprises three pairs of surfaces, the surfaces of each pair being located on opposite sides of the cutting insert 10. A first pair comprising an upper surface 12 and a lower surface 14. A second pair comprising a front surface 20 and a rear surface 22, and a third pair comprising two side surfaces 24. The upper and lower surfaces 12, 14 and the side surfaces 24 extend between the front and rear surfaces 20, 22.

The upper surface 12 joins each of the side surfaces 24 through a corner surface 16 at each side of the upper surface 12. Likewise, the lower surface 14 joins each of the side surfaces 24 through a corner surface 16 at each side of the lower surface 14.

Figure 3:
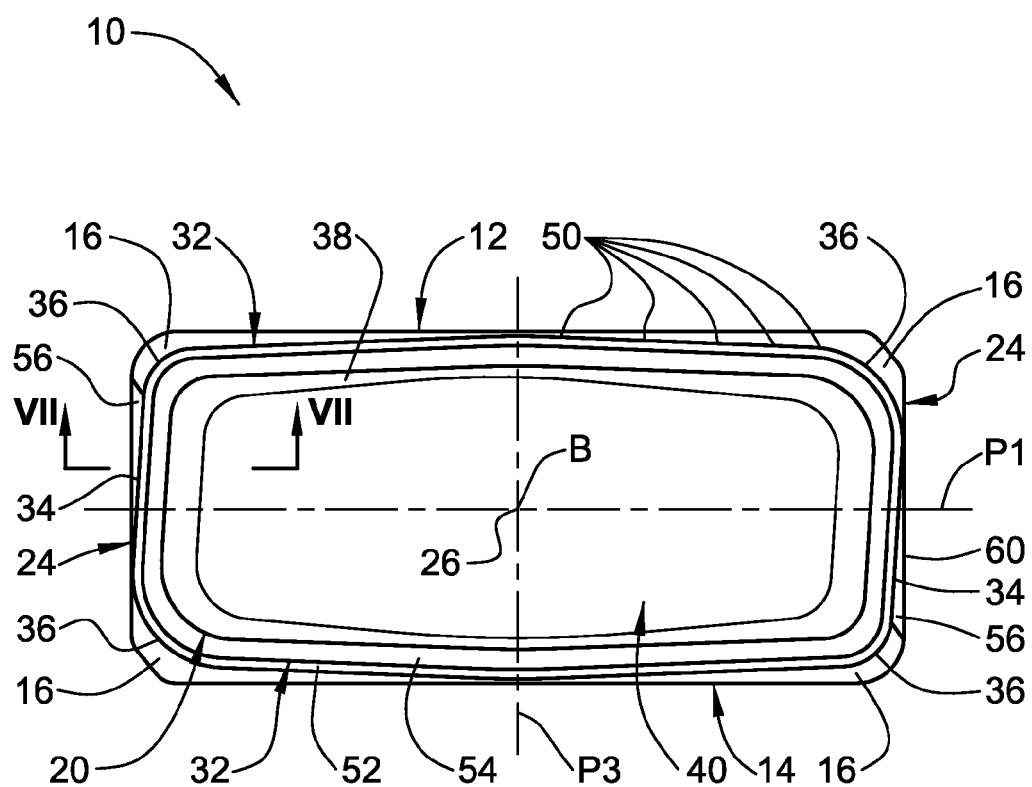
FIG. 3 is a front view of the cutting insert of FIG. 1.

The cutting insert 10 may have mirror symmetry with respect to a first symmetry plane P1. The first symmetry plane P1 is located midway between the upper and lower surfaces 12, 14 as seen in FIG. 3. A through bore 18 having an axis A extends between the upper surface 12 and the lower surface 14. The axis A may be perpendicular to the first symmetry plane P1.

Figure 4:
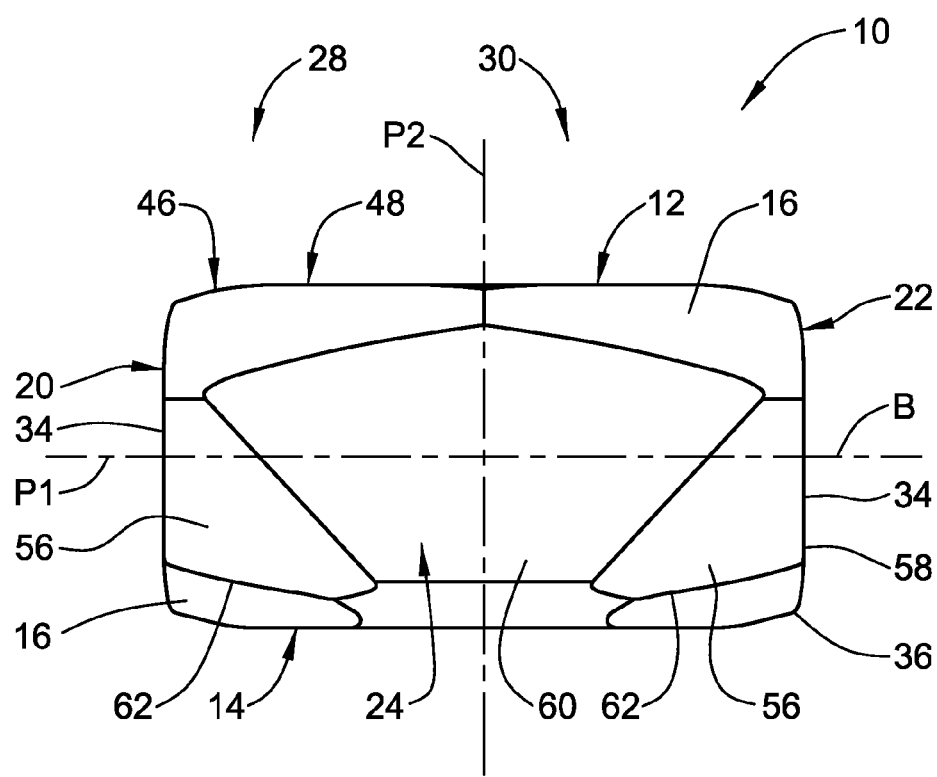
FIG. 4 is a side view of the cutting insert of FIG. 1.

According to a specific embodiment of the present invention, the cutting insert 10 also has mirror symmetry with respect to a second symmetry plane P2. The second symmetry plane P2 is perpendicular to a central portion 48 of the upper and lower surfaces 12, 14, perpendicular to the side surfaces 24, and passes through the axis A of the through bore 18 as seen in FIGS. 2 and 4.

Figure 2:
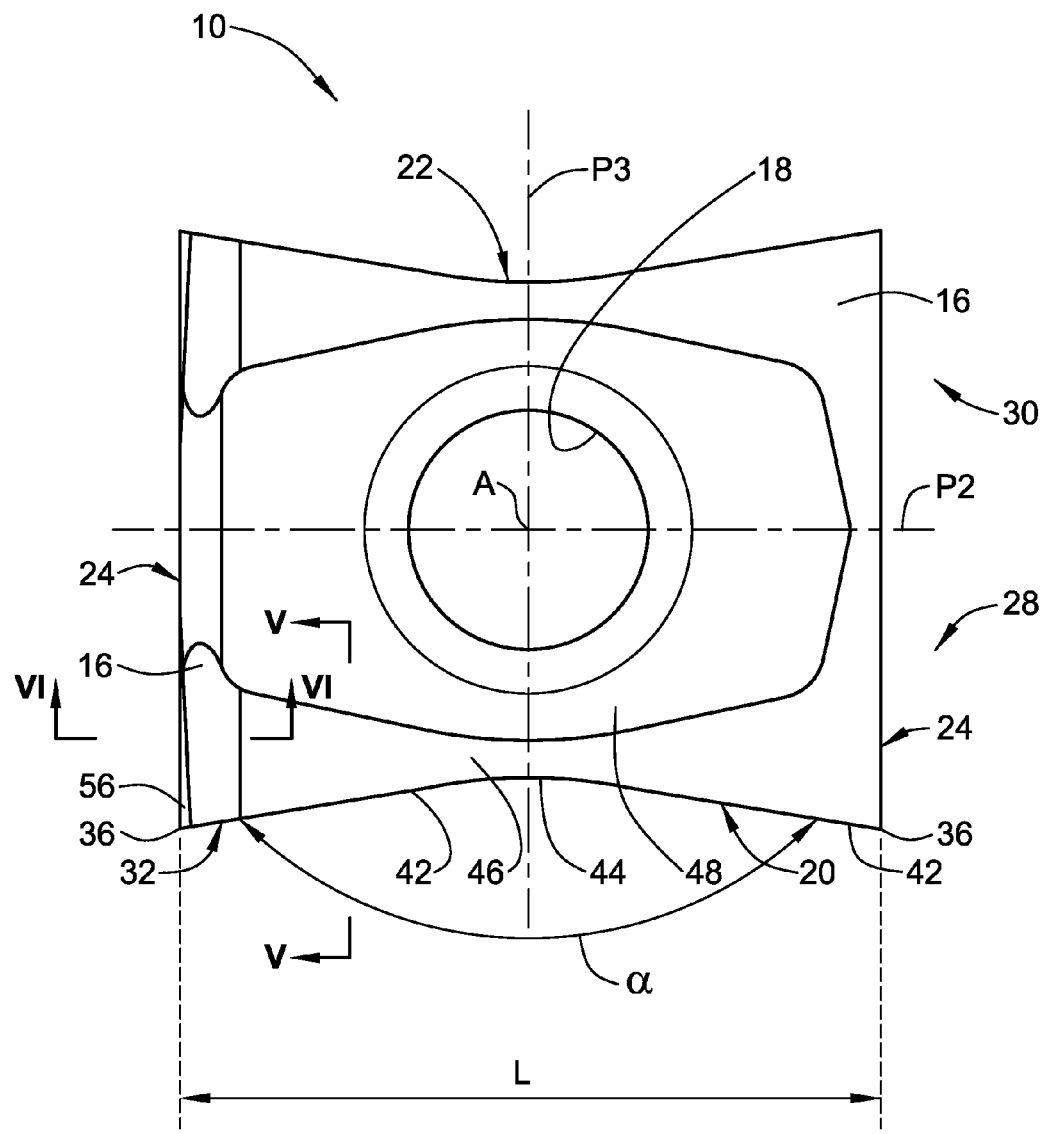
FIG. 2 is a top view of the cutting insert of FIG. 1.

The cutting insert 10 also may have mirror symmetry with respect to a third symmetry plane P3 that is perpendicular to the upper and lower surfaces 12, 14, includes the axis A of the through bore 18 and passes through a center 26 of the front surface 20 as seen in FIGS. 2 and 3.

The cutting insert 10 has 180° rotational symmetry with respect to a symmetry axis B that is formed by the intersection of the first and the third symmetry planes P1, P3.

Since the cutting insert 10, according to the present invention, is symmetrical with respect to the second symmetry plane P2 thus having a cutting insert front section 28 and an identical cutting insert rear section 30, only the cutting insert front section 28 will be described. A main cutting edge 32 is formed at the intersection of the front surface 20 with the upper surface 12. Likewise, another main cutting edge 32 is formed at the intersection of the front surface 20 with the lower surface 14. Two auxiliary cutting edges 34 are formed at the intersection of the front surface 20 with each of the side surfaces 24. Four corner cutting edges 36 are formed at the intersection of the front surface 20 with each of the corner surfaces 16. The four corner cutting edges 36 join between each of the main cutting edges 32 and the auxiliary cutting edges 34.

The main cutting edges 32, auxiliary cutting edges 34 and corner cutting edges 36 have a rake surface 38 associated therewith in the front surface 20. According to a specific embodiment of the present invention, the rake surface 38 extends along the entire circumference of the front surface 20. Further according to a specific embodiment of the present invention, the rake surface 38 extends from an associated cutting edge to a base surface 40 of the front surface 20 in an inward direction of the cutting insert 10. The inward direction means that the rake surface 38 extends from an associated cutting edge toward the center 26 of the front surface 20, and, rearwardly with respect to the associated cutting edges, and toward the second symmetry plane P2.

As seen in FIG. 2, the main cutting edge 32 slopes inwardly and rearwardly from the corner cutting edges 36. The main cutting edge 32 comprises two lateral cutting edge sections 42. Each of the lateral cutting edge sections 42 slopes inwardly and rearwardly from its associated corner cutting edge 36, as seen in a top view of the cutting insert 10. The lateral cutting edge sections 42 join a central cutting edge section 44 that is generally parallel to the second symmetry plane P2. The two lateral cutting edge sections 42 form therebetween a lateral section angle $\alpha$ that is typically in the range of 140° to 180°. According to a specific embodiment of the present invention, the lateral section angle $\alpha$ is about 160°, the term "about" meaning that the value is within a degree or so of the given figure. If desired, the two lateral cutting edge sections 42 and the central cutting edge section 44 therebetween may form a continuously curved cutting edge 32 as seen in a top view of the cutting insert 10.

As seen in FIG. 2, the two lateral cutting edge sections 42 of the main cutting edge 32 are slanted at opposite directions with respect to the second symmetry plane P2. There can be advantages to retaining the cutting insert 10 in a pocket of an associated tool holder (not shown) in a "tangential" manner as known in the art, and using the entire length of the main cutting edge 32 to cut a workpiece.

First, the axial forces acting on the oppositely directed lateral cutting edge sections 42 more or less cancel each other out. As a consequence, almost no net axial force acts on the cutting insert 10 during machining. This reduces chatter of the cutting insert 10, thus potentially increasing the quality of the surface finish and increasing the tool life of the cutting insert 10.

A second advantage may be realized by the oppositely directed lateral cutting edge sections 42 when the entire main cutting edge 32 is used to cut a workpiece. The chip produced by the cutting edge 32 is formed in a shape of two truncated cones connected at their base. Thus, since each portion of the chip, i.e., a portion having the shape of a single truncated cone, is formed by a single lateral cutting edge portion 42, the chip portion tends to roll around its axis, toward the center of the chip, and toward the other chip portion. Hence, the chip tends to shrink from its peripheral ends toward its center. In this manner, the total length of the chip is somewhat smaller then the length of cut. This introduces a meaningful advantage when machining parts that have limited space for chip removal, such as crankshafts.

Figure 5:
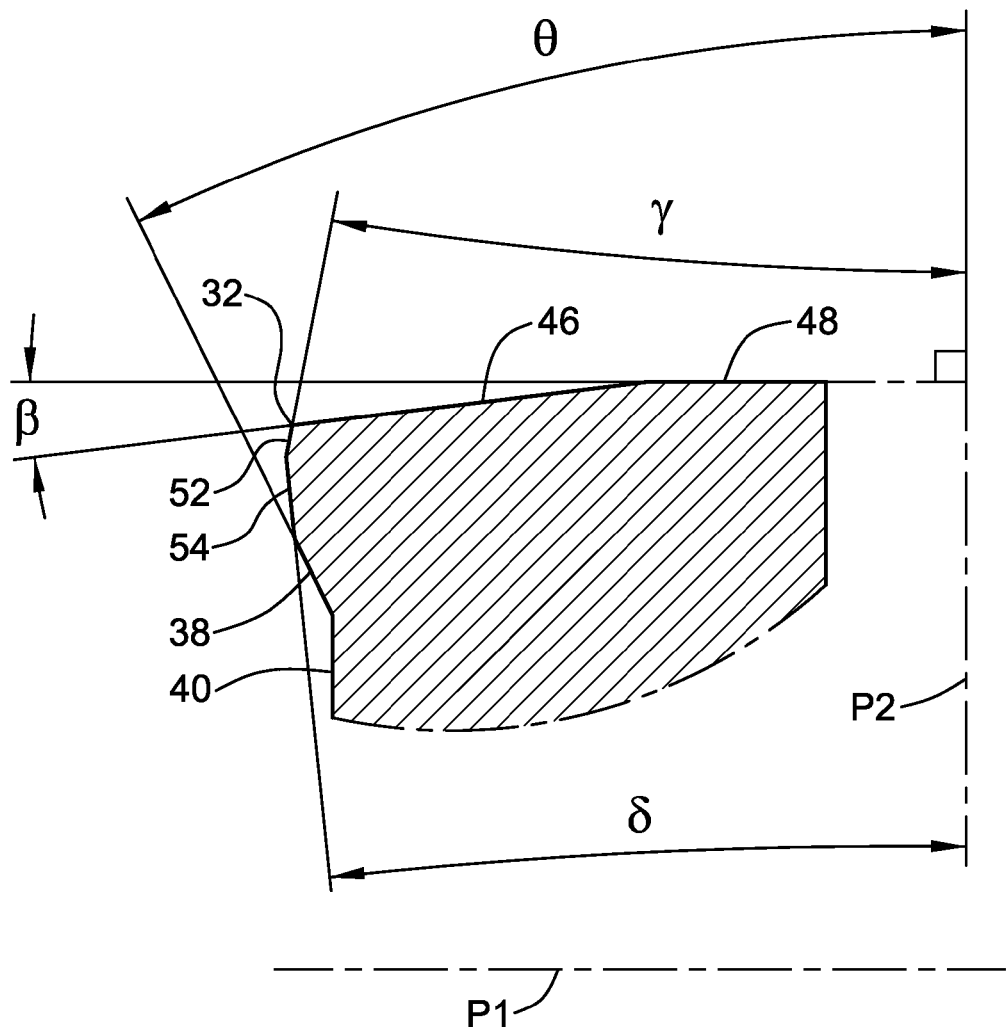
FIG. 5 is a cross-sectional view of the cutting insert taken along line V-V in FIG. 2.

The upper surface 12 of the cutting insert 10 comprises a front portion 46 and a central portion 48 rearward of the front portion 46. The central portion 48 of the upper surface 12 may be flat and is parallel to the first symmetry plane P1. The front portion 46 of the upper surface 12 extends rearwardly from the main cutting edge 32 and upwardly toward the central portion 48 of the upper surface 12. As seen in FIG. 5, the front portion 46 of the upper surface 12 extends upwardly toward the central portion 48 of the upper surface 12 at an upper slant angle $\beta$. Typically, the upper slant angle $\beta$ is in the range of 1° to 15°. According to a specific embodiment of the present invention, the upper slant angle $\beta$ is about 7°.

As seen in a front view of the cutting insert 10 (see FIG. 3), each main cutting edge 32 is curved and slopes in a direction of the first symmetry plane P1 (and thus in the direction of the other main cutting edge 32), from the central cutting edge section 44 toward each of the auxiliary cutting edges 34. Thus, the main cutting edge 32 associated with the upper surface 12 slopes downwardly while the main cutting edge 32 associated with the lower surface 14 slopes upwardly. The main cutting edge 32 is curved and is formed from various arc segments 50. According to some embodiments, each of the arc segments 50 has a different radius. Typically, the radii of the various arc segments vary from 5 mm to infinity (i.e., straight line segments).

As seen in FIG. 5, the cutting insert 10 has a first land 52 that extends from the main cutting edge 32 toward the first symmetry plane P1. The first land 52 is slanted at a first land angle $\gamma$ with respect to the second symmetry plane P2. Typically, the first land angle $\gamma$ is in the range of −10° to 20° as seen in a side cross-section of the main cutting edge 32 and measured upwardly from the main cutting edge 32. According to a specific embodiment of the present invention, the first land angle $\gamma$ is about 10°.

As seen in FIG. 5, the cutting insert 10 has a second land 54 that extends from the first land 52 toward the first symmetry plane P1. The second land 54 is slanted at a second land angle $\delta$ with respect to the second symmetry plane P2. Typically, the second land angle $\delta$ is in the range of −10° to 25° as seen in a side cross-section of the main cutting edge 32 and measured downwardly from the main cutting edge 32. According to a specific embodiment of the present invention, the second land angle $\delta$ is about 5°.

During machining, the cutting insert 10 is securely clamped by a clamping screw within a pocket of a cutting tool (not shown). The design of the first land angle $\gamma$ and the second land angle $\delta$ is such that it considerably reduces the torque applied on the cutting insert 10 during machining, a torque that tends to move the cutting insert 10 out of its pocket. Consequently, the torque applied on the clamping screw is also considerably reduced. Hence, the stresses on the clamping screw are reduced, a fact that increases the screw's life and allows the cutting insert 10 to work at high feed rates without worrying that the clamping screw may shear.

Furthermore, the design of the first land angle $\gamma$ and the second land angle $\delta$ may be such that the forces applied on the cutting insert 10 during machining will tend to further retain the cutting insert 10 within its pocket, thus, the clamping will be more stable and the screw's life will be increased.

As seen in FIG. 5, the rake surface 38 extends from the second land 54 towards the first symmetry plane P1. The rake surface 38 is slanted at a rake angle $\theta$ with respect to the second symmetry plane P2. Typically, the rake angle $\theta$ is in the range of 0° to 60° as seen in a side cross-section of the main cutting edge 32 and measured upwardly from the main cutting edge 32. According to a specific embodiment of the present invention, the rake angle $\theta$ is about 44°.

When machining a workpiece, the cutting insert 10 cuts up to a depth of cut that is approximately equal to the length L of the cutting insert 10. Therefore, the cutting insert 10 is provided with four full length main cutting edges 32. Two of the main cutting edges 32 are located at the front surface 20 and can be used for a specific hand machining, i.e., either for right hand machining or for left hand machining. The other two main cutting edges 32 are located at the rear surface 22, and can be used for the opposite specific hand machining used by the main cutting edges 32 of the front surface 20. The cutting insert 10 according to the present invention may be used to cut a perfect 90° extended shoulder due to the fact that the entire length of the main cutting edge 32 lies on a cylindrical surface.

In order to enable the use of the cutting insert 10 for machining in different directions, the cutting insert has two pairs of side relief surfaces 56. A first pair of identical side relief surfaces 56 is located in the cutting insert front section 28, and a second pair of identical side relief surfaces 56 is located in the cutting insert rear section 30.

A given side relief surface 56 is formed on a given side surface 24. According to a specific embodiment of the present invention, the side relief surface 56 is provided with two edges. A first edge 58 of the side relief surface 56 is formed at the intersection of the side relief surface 56 with the adjacent auxiliary cutting edge 34. A second edge 62 of the side relief surface 56 is formed at the intersection of the side relief surface 56 with the adjacent corner surface 16. The side relief surface may be flat or curved.

Figure 6:
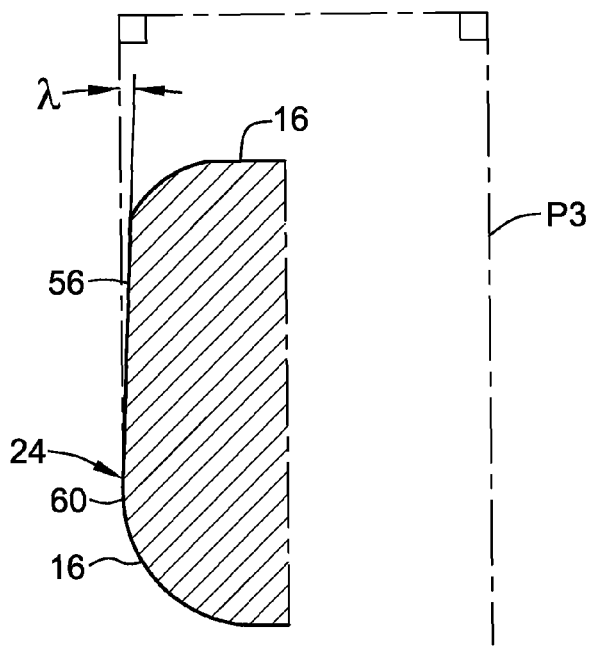
FIG. 6 is a cross-sectional view of the cutting insert taken along line VI-VI in FIG. 2.

As seen in FIG. 6, the side relief surface 56 is slanted at a radial relief angle $\lambda$ with respect to the third symmetry plane P3. Typically, the radial relief angle $\lambda$ is in the range of 0° to 5° as seen in a front view of the cutting insert 10. According to a specific embodiment of the present invention, a central portion 60 of the side surface 24 is planar and parallel to the third symmetry plane P3. Therefore, in such a case, the side relief surface 56 is slanted at the radial relief angle $\lambda$ also with respect to the central portion 60 of the side surface 24.

Figure 7:
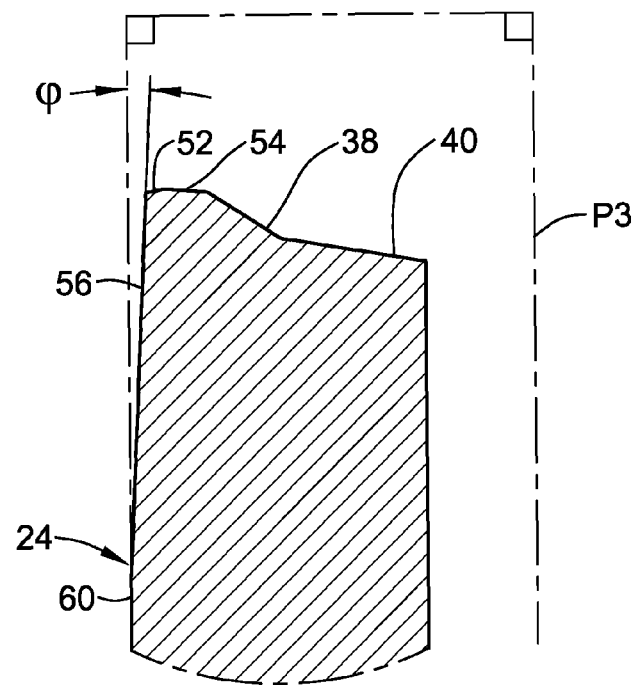
FIG. 7 is a cross-sectional view of the cutting insert taken along line VII-VII in FIG. 3.

As seen in FIG. 7, the side relief surface 56 is slanted at a peripheral relief angle $\phi$ with respect to the third symmetry plane P3. Typically, the peripheral relief angle $\phi$ is in the range of 0° to 8°. Since the central portion 60 of the side surface 24 is planar and parallel to the third symmetry plane P3, the side relief surface 56 is also slanted at the peripheral relief angle $\phi$ with respect to the central portion 60 of the side surface 24.

Although the present invention has been described to a certain degree of particularity, it should be understood that various alterations and modifications could be made without departing from the spirit or scope of the invention as hereinafter claimed.

For example, as seen in FIG. 3, the corner cutting edges 36 associated with a given main cutting edge 32 are identical. Thus, cutting insert 10 has mirror symmetry with respect to the third symmetry plane P3 except for the corner surfaces 16 and the side relief surfaces 56. However, in other embodiments, depending on the design needs, the four corner cutting edges 36 may differ from one another in different ways, such as by having different radii or shapes.

Figure 8:
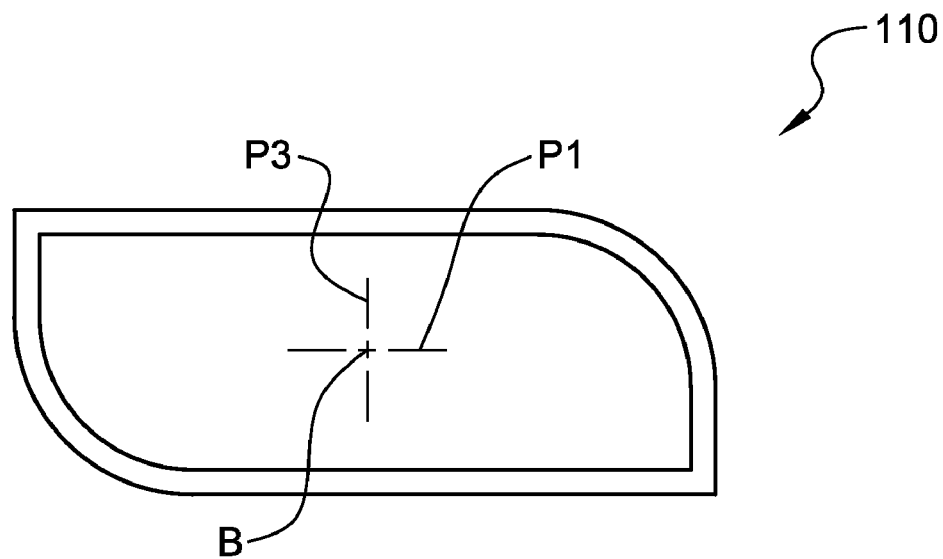
FIG. 8 is a front view of a second embodiment of a cutting insert in accordance with the present invention.

For instance, in the front view of a second embodiment of a cutting insert 110, seen in FIG. 8, the corner cutting edges associated with a given main cutting edge have a different shape or radius while diagonally opposite corner cutting edges have an identical shape or radius. As a consequence, in a front view of cutting insert 110, there is no general mirror symmetry with respect to the first and third symmetry planes P1, P3, but, only a 180° rotational symmetry with respect to the symmetry axis B.

Figure 9:
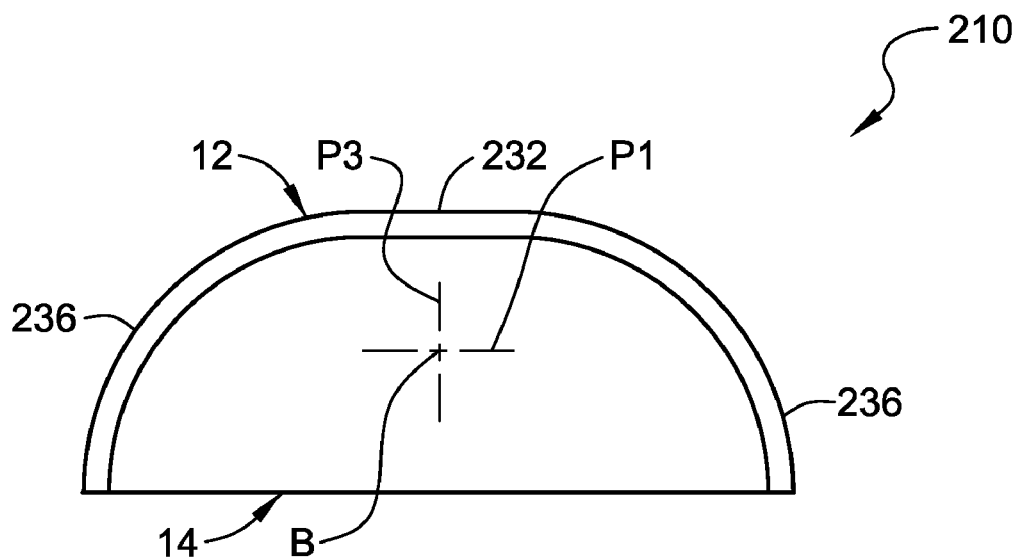
FIG. 9 is a front view of a third embodiment of a cutting insert in accordance with the present invention.

The design needs may be such that the shape or radius of the corner cutting edges 36 will eliminate the option of having a first symmetry plane P1 between the upper surface 12 and the lower surface 14. In such a case, as shown schematically in FIG. 9, the cutting insert 210 according to a third embodiment of the present invention will not be indexable between the upper surface 12 and the lower surface 14. Rather, only a main cutting edge 232 associated with the upper surface 12, and one of the associated corner cutting edges 236 may be used.

In other embodiments, the cutting insert rear section 30 may be different from the cutting insert front section 28, so that the cutting insert rear section 30 or the rear surface 32 may be received into a different type of insert pocket and/or abutted in a different manner when the cutting insert is retained in a pocket of an associated tool holder.

What is claimed is:

1. A cutting insert (10) comprising:
   a front surface (20) extending between an upper surface (12), a lower surface (14) and two side surfaces (24) that extend between the upper surface (12) and the lower surface (14), the upper surface (12) joining each of the side surfaces (24) through a corner surface (16) at each side of the upper surface (12);
   a main cutting edge (32) associated with the upper surface (12) formed at the intersection of the front surface (20) with the upper surface (12),
   auxiliary cutting edges (34) formed at the intersection of the front surface (20) with each of the side surfaces (24); and
   corner cutting edges (36) formed at the intersection of the front surface (20) with each of the corner surfaces (16); wherein:
   the main cutting edge (32), the auxiliary cutting edges (34) and the corner cutting edges (36) have a rake surface (38) associated therewith in the front surface (20);
   a front portion (46) of the upper surface (12) extends rearwardly from the main cutting edge (32) and upwardly toward a central portion (48) of the upper surface (12) as seen in a side view of the cutting insert (10);
   the main cutting edge (32) is curved and slopes downwardly toward each of the auxiliary cutting edges (34) as seen in a front view of the cutting insert (10);
   the main cutting edge (32) slopes inwardly and rearwardly from the corner cutting edges (36) as seen in a top view of the cutting insert (10); and
   the entire length of the main cutting edge (32) lies on a cylindrical surface.

2. The cutting insert (10) according to claim 1, further comprising:
   a through bore (18) that extends between the upper surface (12) and the lower surface (14).

3. The cutting insert (10) according to claim 1, wherein:
   the main cutting edge (32) is continuously curved as seen in a top view of the cutting insert (10).

4. The cutting insert according to claim 1, wherein the rake surface (38) extends in an inward direction of the cutting insert (10).

5. A cutting insert (10) comprising:
   a front surface (20) extending between an upper surface (12), a lower surface (14) and two side surfaces (24) that extend between the upper surface (12) and the lower surface (14), the upper surface (12) joining each of the side surfaces (24) through a corner surface (16) at each side of the upper surface (12);
   a main cutting edge (32) associated with the upper surface (12) formed at the intersection of the front surface (20) with the upper surface (12);
   auxiliary cutting edges (34) formed at the intersection of the front surface (20) with each of the side surfaces (24);
   corner cutting edges (36) formed at the intersection of the front surface (20) with each of the corner surfaces (16); and
   a side relief surface (56) at one of the side surfaces (24), the side relief surface (56) joining one of the auxiliary cutting edges (34) at a first edge (58) of the side relief surface (56) and a corner surface (16) at a second edge (62) of the side relief surface (56); wherein:
   the main cutting edge (32), the auxiliary cutting edges (34) and the corner cutting edges (36) have a rake surface (38) associated therewith in the front surface (20);
   a front portion (46) of the upper surface (12) extends rearwardly from the main cutting edge (32) and upwardly toward a central portion (48) of the upper surface (12) as seen in a side view of the cutting insert (10); and
   the main cutting edge (32) is curved and slopes downwardly toward each of the auxiliary cutting edges (34) as seen in a front view of the cutting insert (10); and
   the rake surface (38) extends along the entire circumference of the front surface (20).

6. The cutting insert (5) according to claim 5, wherein:
   the front surface (20) has mirror symmetry with respect to a first symmetry plane (P1) that is located midway between the upper and lower surfaces (12, 14).

7. The cutting insert (10) according to claim 5, wherein:
   the cutting insert (10) has rotational symmetry with respect to a symmetry axis (B) that is located midway between the central portion (48) of the upper and lower surfaces (12, 14), parallel to the central portion (48) of upper and lower surfaces (12, 14) and parallel to the side surfaces (24).

8. The cutting insert (10) according to claim 5, wherein:
   the side relief surface (56) is slanted at a radial relief angle ($\lambda$) with respect to a third symmetry plane (P3) that is:
   parallel to a central portion (60) of the side surfaces (24);
   perpendicular to the central portion (48) of the upper and lower surfaces (12, 14); and
   passes through a center (26) of the front surface (20); and
   the radial relief angle ($\lambda$) is in the range of 0° to 5°, as seen in a front view of the cutting insert (10).

9. The cutting insert (10) according to claim 8, wherein the radial relief angle ($\lambda$) is about 2.8°.

10. The cutting insert (10) according to claim 8, wherein:
    The side relief surface (56) is slanted at a peripheral relief angle ($\phi$) with respect to the third symmetry plane (P3); and
    the peripheral relief angle ($\phi$) is in the range of 0° to 8°.

11. The cutting insert (10) according to claim 10, wherein the peripheral relief angle ($\phi$) is about 3°.

12. The cutting insert (10) according to claim 5, wherein:
the cutting insert (10) has mirror symmetry with respect to a second symmetry plane (P2) that is perpendicular to the central portion (48) of the upper surface (12) and to the side surfaces (24); and
the second symmetry plane (P2) is located midway between the front surface (20) and a rear surface (22).

13. The cutting insert (10) according to claim 5, wherein:
the cutting insert comprises a through bore (18) that extends between the upper surface (12) and the lower surface (14); and
the cutting insert (10) has 180° rotational symmetry with respect to a symmetry axis (B) that is located midway between the central portion (48) of the upper and lower surfaces (12, 14), parallel to the central portion (48) of the upper and lower surfaces (12, 14) and parallel to the side surfaces (24).

14. A cutting insert (10) comprising:
a front surface (20) extending between an upper surface (12), a lower surface (14) and two side surfaces (24) that extend between the upper surface (12) and the lower surface (14), the upper surface (12) joining each of the side surfaces (24) through a corner surface (16) at each side of the upper surface (12);
a main cutting edge (32) associated with the upper surface (12) formed at the intersection of the front surface (20) with the upper surface (12);
auxiliary cutting edges (34) formed at the intersection of the front surface (20) with each of the side surfaces (24); and
corner cutting edges (36) formed at the intersection of the front surface (20) with each of the corner surfaces (16); wherein:
the main cutting edge (32), the auxiliary cutting edges (34) and the corner cutting edges (36) have a rake surface (38) associated therewith in the front surface (20);
a front portion (46) of the upper surface (12) extends rearwardly from the main cutting edge (32) and upwardly toward a central portion (48) of the upper surface (12) as seen in a side view of the cutting insert (10);
the main cutting edge (32) is curved and slopes downwardly toward each of the auxiliary cutting edges (34) as seen in a front view of the cutting insert (10);
the main cutting edge (32) comprises two lateral cutting edge sections (42) that slope inwardly and rearwardly from the corner cutting edges (36) and a central cutting edge section (44) between the two lateral cutting edge sections (42), as seen in a top view of the cutting insert (10).

15. The cutting insert (10) according to claim 14, wherein the two lateral cutting edge sections (42) form therebetween a lateral section angle (α) that is in the range of 140° to 180°.

16. The cutting insert (10) according to claim 15, wherein the lateral section angle (α) is about 160°.

17. A cutting insert (10) comprising:
a front surface (20) extending between an upper surface (12), a lower surface (14) and two side surfaces (24) that extend between the upper surface (12) and the lower surface (14), the upper surface (12) joining each of the side surfaces (24) through a corner surface (16) at each side of the upper surface (12);
a main cutting edge (32) associated with the upper surface (12) formed at the intersection of the front surface (20) with the upper surface (12);
auxiliary cutting edges (34) formed at the intersection of the front surface (20) with each of the side surfaces (24); and
corner cutting edges (36) formed at the intersection of the front surface (20) with each of the corner surfaces (16); wherein:
the main cutting edge (32), the auxiliary cutting edges (34) and the corner cutting edges (36) have a rake surface (38) associated therewith in the front surface (20);
a front portion (46) of the upper surface (12) extends rearwardly from the main cutting edge (32) and upwardly toward a central portion (48) of the upper surface (12) as seen in a side view of the cutting insert (10);
the main cutting edge (32) is curved and slopes downwardly toward each of the auxiliary cutting edges (34) as seen in a front view of the cutting insert (10);
the front portion (46) of the upper surface (12) extends upwardly toward the central portion (48) of the upper surface (12) at an upper slant angle (β), as seen in a side view of the cutting insert (10); and
the upper slant angle (δ) is about 7°.

18. A cutting insert (10) comprising:
a front surface (20) extending between an upper surface (12), a lower surface (14) and two side surfaces (24) that extend between the upper surface (12) and the lower surface (14), the upper surface (12) joining each of the side surfaces (24) through a corner surface (16) at each side of the upper surface (12);
a main cutting edge (32) associated with the upper surface (12) formed at the intersection of the front surface (20) with the upper surface (12);
auxiliary cutting edges (34) formed at the intersection of the front surface (20) with each of the side surfaces (24); and
corner cutting edges (36) formed at the intersection of the front surface (20) with each of the corner surfaces (16); wherein:
the main cutting edge (32), the auxiliary cutting edges (34) and the corner cutting edges (36) have a rake surface (38) associated therewith in the front surface (20);
a front portion (46) of the upper surface (12) extends rearwardly from the main cutting edge (32) and upwardly toward a central portion (48) of the upper surface (12) as seen in a side view of the cutting insert (10);
the main cutting edge (32) is curved and slopes downwardly toward each of the auxiliary cutting edges (34) as seen in a front view of the cutting insert (10);
the cutting insert (10) has a first land (52) that extends from the main cutting edge (32) toward the lower surface (14);
the first land (52) is slanted at a first land angle (γ) with respect to a second symmetry plane (P2) that is perpendicular to the central portion (48) of the upper surface (12) and to the side surfaces (24); and
the first land angle (γ) is in the range of −10° to 20°, as seen in a side cross-section of the main cutting edge (32) and measured upwardly from the main cutting edge (32).

19. The cutting insert (10) according to claim 18, wherein the first land angle (γ) is about 10°.

20. The cutting insert (10) according to claim 18, wherein:
the cutting insert (10) has a second land (54) that extends from the first land (52) toward the lower surface (14);
the second land (54) is slanted at a second land angle (δ) with respect to the second symmetry plane (P2); and
the second land angle (δ) is in the range of −10° to 25°, as seen in a side cross-section of the main cutting edge (32) and measured downwardly from the main cutting edge (32).

21. The cutting insert (10) according to claim 20, wherein the second land angle (δ) is about 5°.

22. The cutting insert (10) according to claim 20, wherein:
the rake surface (38) extends from the second land (54) toward the lower surface (14);
the rake surface (38) is slanted at a rake angle (θ) with respect to the second symmetry plane (P2); and
the rake angle (θ) is in the range of 0° to 60°, as seen in a side cross-section of the main cutting edge (32) and measured upwardly from the main cutting edge (32).

23. The cutting insert (10) according to claim 22, wherein the rake angle (θ) is about 44°.

24. A cutting insert (10) comprising:
a front surface (20) extending between an upper surface (12), a lower surface (14) and two side surfaces (24) that extend between the upper surface (12) and the lower surface (14), the upper surface (12) joining each of the side surfaces (24) through a corner surface (16) at each side of the upper surface (12);
a main cutting edge (32) associated with the upper surface (12) formed at the intersection of the front surface (20) with the upper surface (12);
auxiliary cutting edges (34) formed at the intersection of the front surface (20) with each of the side surfaces (24); and
corner cutting edges (36) formed at the intersection of the front surface (20) with each of the corner surfaces (16);
wherein:
the main cutting edge (32), the auxiliary cutting edges (34) and the corner cutting edges (36) have a rake surface (38) associated therewith in the front surface (20);
a front portion (46) of the upper surface (12) extends rearwardly from the main cutting edge (32) and upwardly toward a central portion (48) of the upper surface (12) as seen in a side view of the cutting insert (10);
the main cutting edge (32) is curved and slopes downwardly toward each of the auxiliary cutting edges (34) as seen in a front view of the cutting insert (10);
the main cutting edge (32) is curved and formed from a plurality of arc segments (50);
each of the arc segments (50) has a different radius; and
the radii of the arc segments (50) vary from 5 mm to infinity, as seen in a front view of the cutting insert (10).

\* \* \* \* \*